United States Patent Office 3,099,110
Patented July 30, 1963

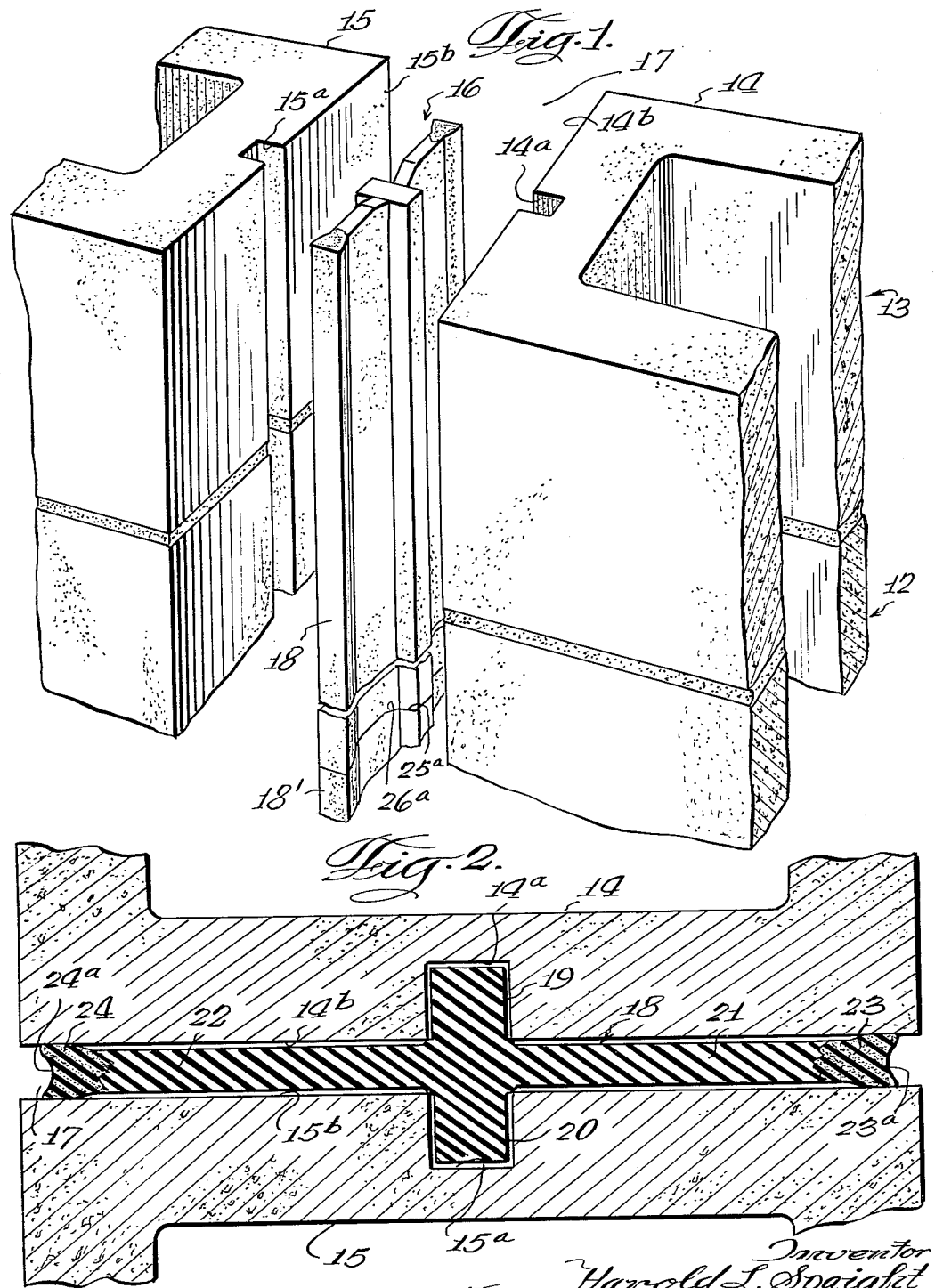

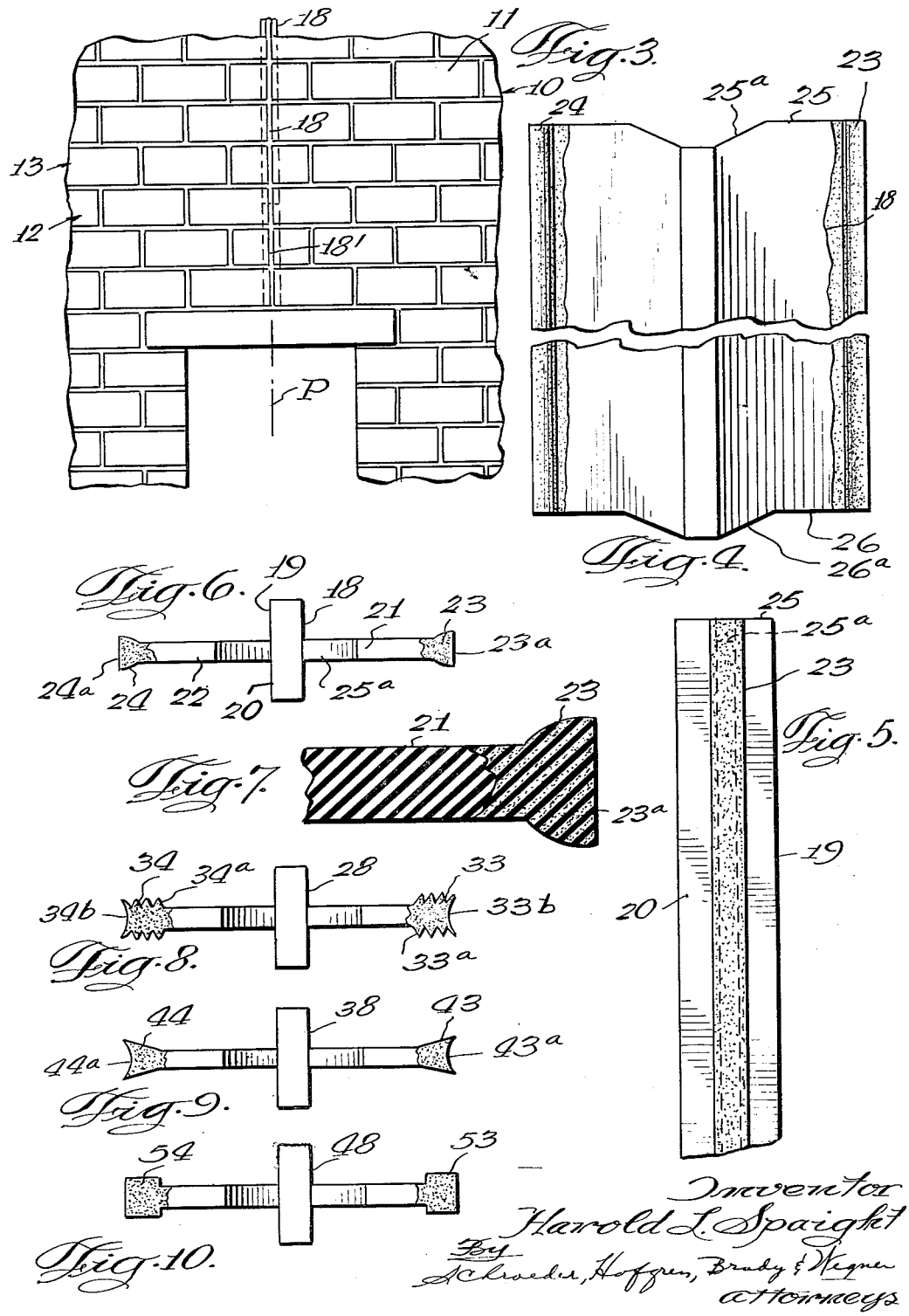

3,099,110
CONTROL JOINT
Harold L. Spaight, Cedar Rapids, Iowa; Elma Spaight executrix of said Harold L. Spaight, deceased, assignor to Dur-O-wal National, Inc., a corporation of Iowa
Filed Sept. 17, 1957, Ser. No. 684,600
5 Claims. (Cl. 50—346)

This invention relates to a masonry joint structure and in particular to a control joint for use in a wall constructed of masonry blocks.

It is desirable to provide in a masonry structure such as a wall, joint means for accommodating expansion and contraction of the wall members. The instant invention relates to a new and improved form of such a joint structure.

The principal feature of this invention is to provide a new and improved control joint.

Another feature is to provide such a control joint comprising a solid strip of resilient material of a predetermined length and having longitudinal ends arranged for sealing engagement with similar such strips to form a continuous joint structure.

A further feature is that the ends extend partially longitudinally of the strip thereby assuring, in a vertical joint structure installation, extension of at least a portion of a strip across each horizontal joint between the wall member courses.

Still another feature is that the control joint comprises a solid strip of rigid material having a new and improved cruciform transverse cross section.

Still another feature of the invention is the provision of such a control joint wherein one pair of arms is substantially longer than the other pair and is provided with enlarged outer ends adapted to engage sealingly the confronting faces of the wall members between which the control joint is installed.

Yet another feature is that the enlarged ends may be flared arcuately convexly to terminate outwardly in a plane.

Another feature is that the enlarged ends may comprise a plurality of wedge-shaped portions.

Still another feature is that the enlarged ends may be flared to terminate outwardly in a cylindrical surface extending parallel to the axis of the strip.

Yet another feature is that the enlarged ends may be square in transverse cross section.

A still further feature of the invention is the provision of such a control joint wherein the ends are formed of a resilient material substantially softer than the remainder of the strip to effect improved sealing engagement with the confronting wall surfaces.

Yet another feature is the provision of a wall construction comprising a plurality of preformed masonry blocks each having a groove aligned with the grooves of vertically adjacent blocks and a control joint comprising a solid strip of resilient material having a cruciform transverse cross section with a pair of short arms received in the grooves and a pair of long arms extending outwardly through the space between the blocks, with enlarged outer ends of the long arms extending horizontally into sealing engagement with the confronting block surfaces.

A yet further feature of the invention is that the outer ends are formed of a material having the color and general appearance of mortar.

Other features and advantages of this invention will be apparent from the following description taken in connection with the accompanying drawings wherein:

FIG. 1 is a fragmentary exploded view of a wall construction including a control joint embodying the invention;

FIG. 2 is an enlarged horizontal cross section of the control joint installed between confronting masonry block portions;

FIG. 3 is a reduced, front elevation of a wall construction including the control joint;

FIG. 4 is a fragmentary side elevation thereof;

FIG. 5 is a fragmentary front elevation thereof;

FIG. 6 is a top end view thereof;

FIG. 7 is an enlarged fragmentary horizontal section thereof;

FIG. 8 is a top end view of another form of control joint embodying the invention;

FIG. 9 is a top end view of yet another form of the control joint; and

FIG. 10 is a top end view of still another form of the control joint.

In the exemplary embodiment of the invention as disclosed in the drawings, a control joint is shown to be associated with a masonry block wall construction to provide a new and improved expansion joint and seal means therein. The control joint is seen to comprise a plurality of individual strips extending vertically end to end to form a continuous sealing joint. The control joint strips are arranged in a new and improved manner to provide improved sealing between the confronting wall blocks and to provide improved sealing engagement with the adjacent strips to provide an improved continuous sealing joint structure.

More specifically, a wall construction generally designated 10 is shown to be comprised of a plurality of masonry blocks 11 arranged in vertically related horizontal courses, such as courses designated generally 12 and 13. At a desired position, wall construction 10 is made discontinuous along a vertical plane P.

The confronting blocks at the discontinuation, such as blocks 14 and 15 of course 13, are spaced apart horizontally and perpendicular to the vertical plane P and a control joint structure 16 is disposed within and across the space 17 between the confronting blocks.

In the illustrated embodiment, masonry blocks 11 comprise conventional hollow core cement blocks of a construction well known in the art. The confronting blocks at plane P are preferably of the type adapted for use with metal window sash, provided with a notch or groove in one end thereof. Thus, block 14 is provided with a groove 14a and block 15 is provided with a groove 15a in the confronting ends 14b and 15b respectively thereof. The confronting blocks of the other courses, such as course 12, are similarly arranged and the grooves of the vertically related blocks are aligned to form a continuous channel.

As described above, control joint structure 16 is comprised of a plurality of discrete strips 18 which strips extend vertically end to end to form the complete control joint structure. Each strip is of a predetermined length, such as 32", for ease in handling, and is formed of a resilient material, such as rubber. As best seen in FIG. 2, strip 18 is cruciform in transverse cross section, having a first pair of relatively short, oppositely extending arm portions 19 and 20 and a second pair of relatively long, oppositely extending arm portions 21 and 22. The short arm portions 19 and 20 are generally rectangular in cross section and are adapted to be received freely within the grooves of the confronting blocks, as grooves 14a and 15a of blocks 14 and 15.

To provide an improved seal with the confronting blocks, the outer ends of long arms 21 and 22 are enlarged as at 23 and 24. The horizontal extent of ends 23 and 24 in the uncompressed state is preferably substantially greater than the horizontal extent of space 17 between blocks 14 and 15 so that when the strip is installed in wall construction 10, the ends are under substantial compressive force effecting an intimate sealing engagement with the adjacent block surfaces. Illustratively, the uncompressed width of ends 23 and 24 may be 5/8" where the conventional width of space 17 is approximately 3/8". Ends 23 and 24 are preferably formed of a relatively soft resilient material to provide improved intimacy of engagement with the blocks. The remainder of the strip 18 is preferably formed of a harder material to provide improved rigidity to the wall construction. I have found that a strip formed of two different types of rubber, wherein the portion thereof defining ends 23 and 24 is formed of a soft rubber of 15 or less Shore durometer hardness and the remainder of the strip is formed of a harder rubber of approximately 90 Shore durometer hardness, is completely satisfactory for this purpose. By utilizing the two types of rubber, the entire strip is formed as a unitary, solid body of high strength and durability.

The length of each of long arms 21 and 22 is preferably made sufficient so that the outer faces 23a and 24a of ends 23 and 24 respectively are spaced slightly less than the width of the blocks 11 as measured parallel to plane P. Thus the ends are disposed only slightly within the outer faces of the blocks, precluding the necessity for caulking the joint subsequent to the installation of the control joint therein. Ends 23 and 24 are preferably formed of a rubber material having a color and general appearance similar to that of mortar so that the omission of caulking material will not be readily discernible.

While it is desirable to provide strips 18 in relatively short lengths to facilitate installation of handling, it is desirable that they be arranged so that when installed they form a continuous, sealing control joint structure 16. For this purpose, the longitudinal ends of each strip are shaped to provide improved engagement with the adjacent strips in the joint structure 16. As best seen in FIG. 3, the ends of strip 18 are arranged so that they extend at least partially longitudinally of the strip. More specifically, one end 25 of the strip is provided with a central recess 25a and the opposite end of the strip 26 is provided with a complementary projection 26a. Thus, as best seen in FIG. 1, a subjacent strip 18' may receive the downwardly extending projection 26a of strip 18 into the upwardly opening recess 25' thereof. Resultingly, the juncture of vertically contiguous strips does not lie in a horizontal plane but extends at least partially transversely to the plane. Thus, should the juncture of the strips happen to be disposed in general horizontal alignment with the space between successive vertically related courses, such as courses 12 and 13, at least a portion of each of strips, as 18 and 18', will extend across the horizontal plane of this space thereby tying the horizontal courses more firmly together.

In the embodiment of FIGS. 1 through 7, ends 23 and 24 of strip 18 are flared arcuately, convexly outwardly and terminate in a planar outer surface 23a and 24a respectively. Thus, when installed in the wall construction 10 as seen in FIG. 2, outer surfaces 23a and 24a are deformed into concave, end surfaces simulating the struck mortar appearance of a conventional wall construction.

In FIGS. 8 through 10 forms of strips having different end structures are shown. Thus, in FIG. 8 a strip 28 generally similar to strip 18 is provided with enlarged ends 33 and 34 each of which ends comprises a plurality of wedge-shaped portions 33a and 34a respectively and an outer semi-cylindrical surface 33b and 34b respectively. Surfaces 33b and 34b extend parallel to the longitudinal axis of the strip. Strip 28 has been found to have improved efficacy where the block surfaces are highly pitted or irregular as it provides a plurality of vertically extending seals.

In FIG. 9 another form of strip 38, generally similar to strip 18, is shown to be provided with flared ends 43 and 44 which are provided with outer semi-cylindrical surfaces 43a and 44a respectively. In FIG. 10 another form of strip 48, generally similar to strip 18, is shown to be provided with ends 53 and 54, each of which is square in transverse cross section. Each of the end construction disclosed, namely ends 23 and 24 of strip 18, ends 33 and 34 of strip 28, ends 43 and 44 of strip 38 and ends 53 and 54 of strip 48 are preferably formed of relatively soft resilient material and provide improved sealing coaction with the confronting surfaces of the wall construction blocks.

The installation of control joint structure 16 in the wall construction is extremely simple. As the respective horizontally extending courses of block 11 are built up, strips 18 are positioned between the confronting blocks at space 17 to extend upwardly therefrom. The strips are automatically positioned in proper relationship with the blocks by the fitting of short arm portions 19 and 20 into the grooves, as grooves 14a and 14b, of the confronting blocks. As no caulking is required, once the blocks are set in place with the ends of the strips properly compressed, the installation of the strip is completed. To effect proper sealing and retaining action by the strips relative to the vertically related courses of blocks 11, the projections and recesses of the strip longitudinal ends assure an extension of the strips across the horizontal spaces between the vertically related courses. Thus the construction of the wall 10 may be effected in the conventional manner in substantially all respects, while control joint 16 provides an improved sealing expansion joint therein requiring no caulking or cementing but which effectively precludes the passage of moisture through the wall at space 17.

The installation of strips 28, 38 and 48 is effected in a similar manner, the enlarged ends of these strips serving to seal the wall similarly.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. A control joint for use in a wall of masonry block, comprising a solid strip of resilient material having end extremities defining its length, said strip having a cruciform transverse cross section defined by two pairs of oppositely extending arm portions each terminating at an edge, the dimension of the first pair of arm portions from edge-to-edge being substantially greater than the dimension of the other pair of arm portions from edge-to-edge, said first pair of arm portions having enlarged portions adjacent said edges, said enlarged portions being formed of a material substantially softer than the remainder of the strip, said second pair of arm portions having one extremity disposed inwardly of the corresponding extremity of said first pair of arm portions and the other extremity of said second pair of arm portions being disposed outwardly of the corresponding extremity of said first pair of arm portions whereby the inwardly disposed extremity of one strip is adapted to receive an outwardly disposed extremity of another strip in sealing engagement therewith to form a longitudinally continuous, joint sealing structure.

2. A control joint for use in a wall of masonry block, comprising a solid strip of resilient material having end extremities defining its length, said strip having a cruciform transverse cross section defined by two pairs of oppositely extending arm portions each terminating at an edge, the dimension of the first pair of arm portions from edge-to-edge being substantially greater than the dimension of the other pair of arm portions from edge-to-edge, said first pair of arm portions having enlarged portions adjacent said edges, said enlarged portions being formed of a material substantially softer than the remainder of the strip whereby said enlarged softer portions are adapted to engage the opposite faces of a masonry wall joint in sealing relationship therewith, the end extremities of said strip being arranged to engage end extremities of other similar strips to form a longitudinally continuous, joint sealing structure.

3. The control joint of claim 2 wherein said enlarged portions are flared widening toward said edges.

4. The control joint of claim 2 wherein said enlarged portions are defined by an outer concave surface.

5. The control joint of claim 2 wherein said enlarged portions are formed of a material having a visual appearance similar to that of mortar.

References Cited in the file of this patent

UNITED STATES PATENTS

| | | |
|---|---|---|
| 1,274,353 | Palmer | July 30, 1918 |
| 1,723,306 | Sipe | Aug. 6, 1929 |
| 2,073,130 | Wallace | Mar. 9, 1937 |
| 2,228,052 | Gardner | Jan. 7, 1941 |
| 2,431,385 | Fischer | Nov. 25, 1947 |
| 2,680,370 | Spaight | June 8, 1954 |
| 2,708,016 | Penton | May 10, 1955 |

OTHER REFERENCES

Journal of The American Concrete Institute; vol. 27, No. 1, p. 85, September 1955.

Concrete, p. 52, July 1957.